United States Patent Office

3,632,535
Patented Jan. 4, 1972

3,632,535
EMULSION POLYMERIZATION METHOD AND RESULTANT AQUEOUS LATEX
Robert E. Gramera, Golfview Hills, Hinsdale, and James P. Hicks, Galesburg, Ill., assignors to CPC International Inc., New York, N.Y.
No Drawing. Filed Sept. 20, 1967, Ser. No. 669,248
Int. Cl. C09j 3/06, 3/12; C08c 17/18
U.S. Cl. 260—17.4
16 Claims

ABSTRACT OF THE DISCLOSURE

Covers a vinyl acetate latex emulsion and its method of preparation. Particularly covers a method of polymerizing a vinyl acetate homopolymer or copolymer thereof in presence of oxidized starch which acts as a protective colloid thereby effecting emulsion stabilization during polymerization and thereafter. Resultant vinyl acetate emulsion latex containing oxidized starch protective colloid is also covered. The product is particularly useful as an adhesive in such applications as affixing backing pads to carpeting.

---

Vinyl acetate emulsion latices, either vinyl acetate homopolymers or copolymers thereof, have found utility in a number of application areas. For example, they have been found to be extremely useful as adhesives in, for example, such fields of use as bonding backing pads to carpeting, in making laminate articles, in forming corrugating paper, etc. The vinyl acetate emulsions are also useful as surface coatings, such as coatings for paper or textiles, and as binders in the same paper and textile industries. In some instances, the polyvinyl acetate homo- or copolymer emulsions are used as adhesives to assemble low-cost furniture.

In order to maintain stability during polymerization of the emulsion and thereafter, particularly during relatively long periods of storage time, the vinyl acetate emulsions are generally prepared in presence of a protective colloid. This material acts to prevent agglomeration of the polymeric particles and reduces undesirable sedimentation. In essence, the protective colloid helps to maintain the particles within a relatively small particle diameter range, and thus prevents the above from occurring. In absence of a protective colloid, gelation most probably will occur, and the entire product generally rendered useless for its intended application.

Probably the most widely used protective colloids for polyvinyl acetates are polyvinyl alcohol and hydroxylethyl cellulose. While these materials perform moderately well in stabiizing the emulsion during polymerization and for a relatively long time thereafter, these particular articles of commerce are relatively expensive. For example, since in order to perform its protective role considerable amounts of polyvinyl alcohol must be utilized, the overall cost of the polyvinyl acetate emulsion is materially increased. For this reason, in some instances other polymeric emulsions must be utilized such as styrene-butadiene copolymers as replacements for the polyvinyl acetate emulsion. Yet in certain application areas these replacement polymers are not as efficient in their particular roles as are the polyvinyl acetate homopolymer or copolymeric emulsions.

Again, use of polyvinyl alcohol protective colloid causes a special problem in the adhesive area. This is due to the fact that the alcohol is incompatible with borax which is also commonly utilized in adhesive applications, particularly in adhesives used to make corrugated articles. Other protective colloids have been experimented with in this area of technology, but have not been found completely suitable by reason of one deficiency or the other.

In view of the above, it therefore becomes an object of the invention to provide a unique polyvinyl acetate emulsion system which contains a relatively inexpensive protective colloid which stabilizes the emulsion in an extremely efficient manner both during polymerization and thereafter. The protective colloid utilized in the invention particularly maintains the polymeric particles within a suitable particle diameter range whereby polymer agglomerates are not formed, and coagulation or polymer flocculation is prevented.

Another object of the invention is to provide a method of polymerizing polyvinyl acetate homopolymers or copolymers in emulsion form by utilization of a protective colloid which does not interfere with the polymerization reaction, and is useful in stabilizing the emulsion both during the polymerization itself and thereafter. The protective colloid utilized herein has excellent stabilization activity during prolonged periods of storage of the emulsion prior to its end-use.

A specific object of the invention is to utilize the just-described latex emulsion as an adhesive to affix a backing pad to carpeting.

Other objects will appear hereinafter.

In accordance with the invention we have discovered a novel polyvinyl acetate emulsion latex. In the broad sense this latex includes a polyvinyl acetate polymer or copolymers of vinyl acetate, and an oxidized starch as a protective colloid. As will be seen hereinafter the starch protective colloid is particularly unique in its role and has unexpected activity in maintaining emulsion stability, compared to seemingly related starch materials.

The invention is also concerned with a method of polymerizing vinyl acetate in emulsion form, and this process broadly comprises the steps of first forming an aqueous reaction mixture containing at least a viny acetate monomer, an initiator and an oxidized starch protective colloid, and effecting an emulsion polymerization of said mixtures. The starch during the polymerization stabilizes and maintain the emulsion and particularly prevents polymer particle agglomeration.

The stabilized latex generally described above has use in any application where conventional polyvinyl acetate homopolymer or copolymeric emulsions are utilized. It has found particular utility in use as an adhesive to affix backing pads to carpeting. In particular, it has been noted that the backing pad when applied to the carpeting by means of the emulsion adhesive tightly adheres thereto almost immediately even in absence of curing, and the resultant article can thus be handled in further processing without fear of the two layers becoming loosened from one another.

POLYMERIZATION DESCRIPTION

In order to suitably polymerize the vinyl acetate a reaction mixture is first prepared. Specifically, an aqueous mixture of a monomer or monomers, initiator, and starch protective colloid is made up. These ingredients may be added to one another in any sequence, and in various concentration levels. For example, the oxidized starch may be pasted up in water, and the monomer or monomers added thereto along with the initiator. Again, the vinyl acetate monomer may be dispersed in water with agitation and the initiator and oxidized starch added thereto.

While the amount of vinyl acetate monomer which may be present is not particularly critical, for best results the vinyl acetate monomer by itself or in combination with other monomers should be present in an amount ranging from about 10 to about 50% by weight based on the entire polymerization system weight. Again, the amount of the oxidized starch present may vary widely depending upon the type of starch utilized, and particular polymerization system involved. In a typical run, the oxidized starch will compose 2–20% by weight of the total emulsion weight, and more typically 5–15% by weight of the entire emulsion system. The quantity of initiator to effectuate the aim of the polymerization will again depend upon other variables involved. Preferably 0.1–5% by weight of initiator is present based on monomer content.

The oxidized starch itself while acting as a protective colloid also tends to emulsify the system during polymerization and thereafter. Thus, no additional emulsifier need be present. However, in some instances addition of an emulsifier is a greatly preferred expedient, and materially aids in the proper distribution of monomer droplets throughout the aqueous phase. In such case, the emulsifier is usually present in an amount ranging from about 0.5% to about 5% based on the total weight of the polymerizable system.

In order to actually effectuate the polymerization, it is only necessary to heat the monomer or monomers, initiator and oxidized starch protective colloid for a time sufficient to substantially complete the polymerization reaction. A typical mode of polymerization involves addition of a portion of the total monomer and initiator to be added to an aqueous solution of starch. For example, 5–25% of the total amount to be added of the vinyl acetate or combination of vinyl acetate and other monomer along with a like amount of initiator is initially added to this aqueous solution, and polymerization initiated. After a suitable amount of time the remainder of the monomer and initiator is added, usually incrementally, in slugs, or continuously, and the polymerization and the polymerization synthesis completed. Usually, the first portion of monomer is allowed to at least partially polymerize for 10–60 minutes before addition of the final amount.

Again, the amount of time to complete polymerization is dependent upon a great number of factors such as monomer concentration and type, temperature, particular initiator utilized, etc. Usually, the polymerization reaction is completed in an amount of time ranging from about ¼–4 hours, and more often in ¼–2 hours. Again, the temperature of polymerization is largely a matter of choice. However, good results are noted when the polymerization temperature ranges from about 60 to about 90° C., and more often ranges from about 65 to about 85° C.

The total solids content including monomer, initiator and oxidized starch can likewise be varied in this versatile system depending upon the desire of the experimenter. Usually the solids content falls within the range of about 20 to about 70% by weight based on the weight of the total emulsion system, including aqueous solvent.

MONOMERS UTILIZED

Of course, the primary monomer constituent used in carrying out the polymerization of the invention is vinyl acetate itself. In order to prepare suitable polyvinyl acetate polymers for various applications as enumerated, it is greatly preferred that the monomer mixture contain at least 55% by weight of vinyl acetate based on total monomer content present. It is understood, of course, that excellent latex emulsions of the invention contain only polyvinyl acetate itself as a homopolymer. However, other polymers in emulsion form have almost equal utility, and in some cases even greater utility which are prepared by copolymerizing vinyl acetate with a wide variety of other monomers. Typical of these that may be used in conjunction with vinyl acetate include acrylic acid, alkyl esters of acrylic acid, such as methyl acrylate etc., salts of acrylic acid, and particularly alkaline earth and alkali metal salts, such as sodium acrylate, magnesium acrylate, etc. as well as diethylamine acrylate. Likewise, compounds such as acrolein, methacrylic acid, maleic acid, and derivatives thereof, such as esters, salts, etc., vinyl sulfonic and vinyl phosphonic acids may be used. Other useful comonomers include trimethylamine methacrylate, diethylmethylene succinate, methyl isopropenyl ketone, ethyl vinyl ketone, vinyl acetate, vinyl pyrrolidone, allyl alcohol, sulfonated styrene, vinyl pyridine, maleic anhydride, sodium maleate, N-allyl amines, vinyl sulfonic salts, allylamines and various other ethylenically unsaturated compounds. Preferred comonomer materials are the acrylates, such as, butyl acrylate, ethyl acrylate, and ethylhexyl acrylate. If present, one or more of these monomers listed above or others may be interpolymerized with vinyl acetate, and generally make up 5–45% by weight of the total monomer mixture including vinyl acetate component.

Thus by the term "vinyl acetate polymer" is meant a polyalkane having integral therewith at least acetate groups of the polymer back-bone and includes both the homopolymer of vinyl acetate and copolymers thereof.

OXIDIZED STARCHES

The basic material used in preparing the oxidized starches is, of course, starch itself. The starting starch material that may be used in practicing the invention may be derived from any vegetable source, such as, for example, corn, wheat, potato, tapioca, rice, sago and grain sorghum. Waxy starches may also be used.

The above described starches or others are then oxidized by a variety of techniques know in the art. A number of reagents are useful here. For example, typical oxidizing agents include hypochlorites, persulfates, peroxides, permanganates, perborates, and others. Any reagent of this type is suitable here as long as it has a sufficiently high oxidizing potential. The oxidizing reaction may be effected in a number of ways, but generally it is simply carried out by slurrying the raw starch in aqueous solution and oxidizing it in this medium with a suitable oxidizing agent. The oxidation reaction is generally carried out under alkaline conditions.

The extent to which the starch may be oxidized again may be widely varied, and will depend in part upon the nature of the oxidizing agent utilized, and conditions under which the reaction is completed. Usually, the final oxidized starch product has a carboxyl content expressed as sodium carboxylate of 0.1–1.0% based on the total starch weight. Sodium hypochlorite oxidized starches having a carboxyl content within the just mentioned range have been found to be extremely useful in the invention, and excellent protective colloids for use in the vinyl acetate polymer system.

The primary role of the protective colloid is to maintain the polymer particles within a relatively small particle diameter range both during polymerization and thereafter. This prevents their being agglomerated into unusable and unsaleable gels or flocs. Generally if the polymer particles are maintained within the range of 0.2–1.2 microns in diameter, and more preferably 0.5–1.0 microns, substantially no agglomeration occurs, even over a relatively long period of storage time.

INITIATOR

In order to carry out the polymeriflaztion reaction an initiator is usually utilized. Both a single initiator such as a water-soluble oxygen-containing initiator, e.g. ammonium, potassium and sodium persulfates, hydrogen peroxide, the alkali metal and ammonium perchlorates, etc. may be used as well as the known two component redox system. In the latter system, water-soluble peroxy initiators such as persulfuric, perboric, perchloric, and permanganic acids, as well as their salts may be suitably employed as the oxidizing component. Particularly, ammonium, potassium and sodium persulfates, hydrogen peroxide and the alkali metal and ammonium perchlorates may be used as oxidizing reagents. As the reducing component silver nitrate, nitrilotrispropionamide, sodium thiosulfate, sodium or potassium bisulfite, thiosulfate, or metabisulfite may be used. Preferred here is the one component system, and more preferably the water-soluble persulfate salts. Most preferably ammonium and alkali metal persulfates are employed. Since the one component initiator system has a lesser tendency to speed up the polymerization reaction that does the redox system, it is preferred as providing greater control of the polymerization pocess as a whole.

The amount of initiator utilized may be varied. One suitable range of initiator lies within about 0.05% to about 5.0% based on the total weight of the latex. More often, the amount of initiator ranges from about 0.05 to about 1.0% based on emulsion weight.

EMULSIFIER

In some instances it may be desirable to have an emulsifier present during the polymerization and thereafter in order to help maintain a "tight" emulsion of suspended polymer particles in water. In many instances, however, use of an emulsion has not been found necessary, since it appears that the starch itself also performs this function. However, an additional emulsifier may be present which aids in forming micelles during polymerization. These additional surfactants or emulsifying agents do not, however, act as protective colloids as does the oxidized starch. In absence of starch protective colloid, even with presence of an emulsifier, substantial agglomeration will take place either during polymerization or in some minimal amount of time after the emulsion is stored, say two days or less.

Typical emulsifiers or surfactants which may be used here include long chain alkyl ammonium halides, e.g. cetyl trimethyl ammonium bromide, myristo amido propyl dimethyl benzyl ammonium bromide; long chain pyridinium halides, e.g. lauryl pyridinium bromides; and long chain alkyl phosphonium and sulfonium compounds and imidazoline salts such as tridecyl benzyl hydroxyethyl imidazolinium chloride. Other suitable surface active aegnts which may be used are those which contain polymerized ethylene oxide units, such as ethylene oxide polymers, ethylene oxide-propylene oxide block polymers, ethylene oxide derivatives of long chain carboxylic acids, such as lauric, palmitic, or oleic acids, and ethylene oxide derivatives of long chain alcohols such as octyl, decyl or cetyl alcohols. Still other emulsifiers include those compounds wherein polyhydric alcohols, as hydrophilic agents, are reacted at one, or at most two hydroxy groups with a hydrophilic agent such as a long chain carboxylic acid, a long chain alcohol, a phenol, an alkyl phenol, an amide or an amine. Among the polyhydric alcohols which may be used are glycerol, sorbitol, mannitol, ethylene glycol, propylene glycol, pentaerythritol, and erythritol. Glyceryl monostearate is an example of a specific compound of this type. One should avoid use of those emulsifiers which are incompatible with certain chemicals such as borax to which the emulsion may be added when particularly utilized as a corrugating adhesive.

In some instances, in order to control the pH of the emulsion and prevent separation of phases, a buffer is also added prior to, during or after polymerization. Such buffers as sodium bicarbonate, sodium hydrogen phosphate, etc. are suitable here. Usually, these are present in an amount ranging from about 0.01 to about 1.0% based on the total emulsion weight.

The following illustrates the preparation of a typical emulsion of the invention. All percentages are by weight unless indicated otherwise.

EXAMPLE I

The following materials were used in preparing the stabilized polyvinyl acetate emulsion.

TABLE I

| Component: | Percent by wt. |
|---|---|
| Water | 50.00 |
| Potassium persulfate initiator | 0.20 |
| Sodium bicarbonate buffer | 0.15 |
| Nonylphenylpolyethoxy-ethanol surfactant | 2.00 |
| Monomer mixture (85% vinyl acetate-15% butyl acrylate) | 44.65 |
| Oxidized starch protective colloid (sodium hypochlorite oxidized) | 3.0 |

The vinyl acetate copolymer was prepared as follows. The oxidized starch protective colloid was pasted in the water for five minutes and then added to a 2-liter resin pot. Sodium bicarbonate and the surfactant were then added to the resin pot and the mixture heated in an automatically controlled water bath. After heating the mixture up to about 55° C., 10% of the total amount of the mixture of monomers to be added and a like amount of initiator were added to the reaction pot to constitute an emulsion. Reflux of the reaction mixture began at 65° C., and at 68° C. incremental addition of the remainder of the mixture of monomers (2–3 ml./min.) and initiator was begun. The reaction was considered complete in 4½–5 hours. The emulsion was further heated to 80° C. for 30 minutes to insure complete reaction. The product was cooled to room temperature and stored in a closed container.

It was noted that the product in emulsion form could be stored for up to six months or more without fear of phase separation, or agglomeration of polymer particles into larger masses. The oxidized starch maintained the polymer particles within the proper particle distribution range, and was extremely efficient in stabilizing the copolymeric emulsion.

EXAMPLE II

In yet another run the homopolymer of vinyl acetate was prepared in presence of the oxidized starch protective colloid. In this particular run essentially the directions outline in Example I were followed with the exception that the amounts of various chemicals utilized were as follows: 46 pounds vinyl acetate, 1 pound emulsifier, 0.2 pound potassium persulfate, 0.15 pound sodium bicarbonate buffer and 2.5 pounds of oxidized starch protective colloid.

Again the above emulsion had excellent long term stability due to action of the protective colloid material.

EXAMPLE III

In yet another run the following ingredients were mixed and polymerized.

TABLE II

| Ingredient: | Percent by wt. |
|---|---|
| Vinyl acetate | 34.40 |
| Butyl acrylate | 14.75 |
| Potassium persulfate | 0.20 |
| Sodium bicarbonate | 0.10 |
| Oxidized starch | 5.00 |
| Water | 45.55 |

The oxidized starch which acted both as a protective colloid and a surfactant here was pasted up in water at 100° C. over a period of 15 minutes. The starch was then added to a resin pot along with the sodium bicarbonate. When the resin vessel reached a temperature of 60° C. 10% of the monomer mixture and the persulfate initiator were added. An exothermic reaction then occurred and was allowed to subside before additional monomer was added. Thereafter, incremental addition of monomers and initiator was begun and carried out over a period of four hours. The polymerization was then completed by cooking the product at 80° C. for 30 minutes.

During the investigations here it was discovered that in order to maintain stability of the polymerized emulsion after reaction was completed, the oxidized starch protective colloid had to be present from time of the initiation of the reaction. That is, if the oxidized starch was added only after polymerization was considered complete, the so-treated emulsion did not possess the proper stability, and many instances became an unusable gelled mass in as little as two days or less time.

It has also been noted that an oxidized starch has surprising efficiency as a protective colloid in this particularly described polymerization emulsion system and carries out its defined role to a much greater degree compared to seemingly similar materials such as starch itself or various starch derivatives. Also, in addition to controlling the particle size of the formed polymer particles, the oxidized starch also controls the thixotropy of the system whereby the proper viscosity is achieved and maintained. Again, during the polymerization reaction itself it was noted that the starch prevented foaming or frothing from occurring. Even after long periods of storage time no grit formation appeared in those emulsions protected with the oxidized starch material. It is also believed that the presence of the oxidized starch tended to speed up the polymerization both in terms of increasing rate, and also in bringing the polymerization to completion, leaving relatively little residual monomer. It is not understood exactly how the oxidized starch brings this feature about, but it is believed that the carbonyl groups present on the starch nucleus act as chain-transfer sites. That is, the oxidized starch acts as a nucleus for polymerization sites. Again, by way of achieving its primary role of maintaining the polymer particles in a suspended condition during polymerization and upon subsequent storage, the oxidized starch prevents particle coalescence and gel formation. In essence, the starch by a coating mechanism prevents access of the particles to one another and limits their contact, thereby preventing particle sedimentation. The entire emulsion system is thus stabilized by such phenomenon.

In order to compare the oxidized starch products of the invention for their activity as protective colloids in vinyl acetate emulsions, a latex emulsion was prepared using these materials and directly compared to a like emulsion made utilizing a thick boiling starch. Use of the oxidized starch as a protective colloid gave materially better results in a number of areas. For example, the emulsion itself had a smoother, creamier texture. Better mechanical stability was exhibited, and less grit was formed through use of oxidized starches compared to the thick boiling starch. Likewise, particles of smaller size were produced, and the emulsion had approximately ⅙ lower viscosity utilizing oxidized starches compared to those emulsions containing thick boiling starches. Further, with use of oxidized starches there was less foaming, easier reaction control, shorter reaction time to achieve the same degree of polymerization, little or no problem of excessive exotherm during polymerization, and crosslinking and branching was held to a minimum. Due to lower viscosity of the emulsion through use of oxidized starches compared to conventional thick boiling starches, one may be allowed to polymerize a higher total solids, allowing greater utility in a number of applications. Moreover, the presence of carboxy groups in the oxidized starch appears to prevent coating of the emulsion on walls of the reaction pots, particularly if glass vessels are used. On the other hand, use of conventional starches does not prevent the tendency of the polymer to coat and accumulate on the reaction vessel walls. It was also noted that the oxidized starch promoted adhesion of polymer to metal surfaces to a greater degree relative to like emulsions containing conventional thick boiling starches.

Further comparisons of oxidized starches and other starches or starch derivatives were made as described below.

EXAMPLE IV

Here a number of starch materials were prepared and utilized as potential protective colloids in the polyvinyl acetate emulsion system. Particularly an 80-fluidity corn starch, a cationic corn starch, a hydroxyethyl corn starch, a phosphate ester of corn starch and a sodium hypochlorite oxidized corn starch were prepared and tested in this work.

In the first series of runs the above corn starch materials were made and then tested as protective colloids in polyvinyl acetate emulsions produced essentially via the emulsion polymerization technique described in Example I, wherein vinyl acetate and butyl acrylate were copolymerized.

The viscosities of all the emulsions prepared containing the various corn starch derivatives were measured at 12 r.p.m. and 60 r.p.m. on a Brookfield viscometer, Model No. LVD at 25° C. A viscosity index was then calculated by dividing the viscosity at 12 r.p.m. by the viscosity at 60 r.p.m. The calculated viscosity index is a measure of emulsion thioxotropy. Of all the starches used as protective colloids, the oxidized starch emulsion had the lowest thixotropy. The hydroxy ethyl starch on the other hand had the highest thixotropy. This property of oxidized starch in not building up excess viscosity of polyvinyl acetate emulsions is important, since a higher solids content of polymer may then be easily prepared and used in various applications such as a corrugating adhesive. This in essence allows more polymer per unit weight of emulsion to be shipped and applied in such end-uses as this and others.

In another series of tests the emulsions containing the various proposed protective colloids were prepared and then particle sizes of the resultant emulsified polymer particles were observed using a binocular microscope. Some agglomeration of the particles into clusters was observed with all the emulsions except those containing 5 and 7% oxidized starch based on total emulsion weight. Thus, it can be seen that the oxidized starches have remarkable ability to maintain the particle size of the emulsions within a substantial uniform range, usually falling within the ½–1 micron particle diameter size. The various other starch derivatives, seemingly similar in chemical and physical characters surprisingly do not have equal ability in this respect.

In another series of tests a cationic starch was compared with an oxidized starch for ability to prevent emulsion sedimentation during storage. As set out above, an important function of a protective colloid is to maintain the stability and uniformity of the emulsion over long periods of time. In this test, solutions of 100 milliliters of a 5% solids emulsion containing either an oxidized starch and a cationic starch as a protective colloid were placed in 100-ml. graduates and allowed to stand for 24 hours. The phase separation and amount of residue were then determined. If more than 4 ml. of phase separation is noted or more than 4 ml. of residue was observed the particular protective colloid tested was considered a failure as a stabilizer of a polyvinyl acetate emulsion. The oxidized starch passed the minimum requirements, but the emulsion containing the cationic starch gave a 4 ml. phase separation in 24 hours.

Still further tests involved effect of addition of organic solvents to the emulsion system, such as methanol. Again emulsions were prepared containing the above proposed protective colloids. Methanol was then incrementally added to 20 gram aliquots of these emulsions. The emulsion was judged to break down when the addition of solvent caused complete coagulation into a spongy mass. In all instances, involving all proposed protective colloids other than the oxidized starch, addition of 20 grams of methanol to 20 grams of emulsion resulted in emulsion degradation. The emulsion containing oxidized starch as a protective colloid, on the other hand, did not suffer emulsion breakdown. Again, this series of tests indicates surprising utility of oxidized starch in this area.

The polyvinyl acetate emulsions, protected and stabilized by the oxidized starch material during polymerization and after long periods of storage time are useful in a number of application areas. For example, they may be used as paper coatings, as textile finishers to increase crease resistance, as paper board adhesives, as protective coatings for all types of surfaces such as metal, as adhesive bases for paint, as aids in pigment dyeing, etc.

One particular area of use for the stabilized polyvinyl acetate homopolymers or copolymers in emulsion form lies in utilization of these materials as adhesives to affix a backing pad to carpeting. Here, fibers such as wool or rayon are punched through a piece of cloth with a needle in the conventional manner. The stabilized polyvinyl acetate latex adhesive is then applied to the back of the carpet to which is then affixed the backing pad. The two materials are more firmly attached by pressure and by drying. It is an important expedient in this area of use that a quick adhesive bond be formed of a sufficient degree of strength to allow further mechanical handling and transfer. This has been achieved through use of the stabilized emulsions of the invention. The backing pad and carpeting remain tightly adherent even in absence of a final cure in ovens. Generally, only ½–1 hour time has been found necessary to realize the proper bond here.

Also, it has been noted that the stabilized or protected emulsions of the invention can be loaded up with considerable filler such as clay, talc, titanium dioxide, blanc fixe, powdered tin, precipitated chalk, satin white, ground limestone, sawdust, etc. Such filler addition to the emulsions of the invention may be made without flocculating or agglomerating the emulsified polymer. Fillers of this type or others are often used in preparing adhesives, such as adhesives used in affixing backing pads to carpeting. In this area calcium carbonate is often the filler ingredient. In some instances it is desired that an extremely high proportion of filler to emulsion be present, say as high as 4:1. Yet, of course, the emulsion must remain as such and not become gelled. Even under this severe situation, the protected emulsions of the invention remain in emulsified form, and the polymer particles do not coalesce into gelled masses. On the other hand, such other emulsions as styrene-butadiene latices are flocculated by addition thereto of substantial amounts of fillers such as calcium carbonate or clay.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A stabilized aqueous latex emulsion comprising dispersed particles of a vinyl acetate polymer and a protective colloid comprising an oxidized starch having a carboxyl content of 0.1–1.0% expressed as sodium carboxylate and based on starch weight.

2. The emulsion of claim 1 wherein said vinyl acetate polymer is a homopolymer.

3. The emulsion of claim 1 wherein said vinyl acetate polymer is a copolymer of vinyl acetate and an alkyl acrylate.

4. The emulsion of claim 3 wherein said acrylate is selected from the group consisting of butyl acrylate, ethyl acrylate, and 2-ethylhexyl acrylate.

5. The emulsion of claim 1 wherein said oxidized starch is a sodium hypochlorite oxidized starch.

6. The emulsion of claim 1 wherein said oxidized starch is present in an amount of 2–20% by weight based on total emulsion weight.

7. A method for the preparation of a vinyl acetate polymer which comprises the steps of forming an aqueous reaction mixture containing at least a vinyl acetate monomer, an initiator, and an oxidized starch protective colloid, said oxidized starch having a carboxyl content of 0.1–1.0% expressed as sodium carboxylate and based on starch weight, and effecting an emulsion polymerization of said mixture, said starch being present to stabilize said emulsion and prevent polymer particle agglomeration during the polymerization reaction and while storing the product emulsion.

8. The method of claim 7 wherein vinyl acetate and an alkyl acrylate are copolymerized.

9. The method of claim 8 wherein said acrylate monomer is selected from the group consisting of butyl acrylate, ethyl acrylate, and ethylhexyl acrylate.

10. The method of claim 7 wherein said oxidized starch is a sodium hypochlorite oxidized starch.

11. The method of claim 7 wherein said starch is present in an amount ranging from about 2 to about 20% by weight based on total reaction mixture weight.

12. The method of claim 7 wherein said reaction mixture contains 20–70% by weight of total solids.

13. The method of claim 7 wherein said emulsion polymerization is run in presence of a buffer.

14. The method of claim 7 wherein said initiator is potassium persulfate.

15. The method of claim 7 wherein said polymer particles are maintained within the range of 0.2–1.2 microns in diameter by presence of said protective colloid.

16. The method of claim 7 wherein said polymerization is carried out at a temperature ranging from about 60° C. to about 90° C. for a period of time ranging from ¼ hour to about 4 hours.

References Cited

UNITED STATES PATENTS

| | | | |
|---|---|---|---|
| 2,998,400 | 8/1961 | French | 260—29.6 |
| 3,058,932 | 10/1962 | Petty | 260—17 |
| 2,894,945 | 7/1959 | Hofreiter | 260—233.3 |

WILLIAM H. SHORT, Primary Examiner

R. J. KOCH, Assistant Examiner

U.S. Cl. X.R.

117—139.4, 155 UA; 156—328; 260—17.4 R, 29.6 RB, 29.6 T, 29.6 PM, 41 B